United States Patent Office 3,473,667
Patented Oct. 21, 1969

3,473,667
CERTAIN N-THIO-2-IMIDAZOLIDINONES
Aubert Yaucher Coran, Creve Coeur, Mo., and Joseph Edward Kerwood, St. Albans, W. Va., assignors to Monsanto Company, St. Louis, Mo., a corporation of Delaware
No Drawing. Continuation-in-part of applications Ser. No. 579,493, Sept. 15, 1966, Ser. No. 549,730, May 12, 1966, and Ser. No. 459,466, May 27, 1965. This application Jan. 8 1968, Ser. No. 696,123
Int. Cl. C07d 49/30
U.S. Cl. 260—309.7   14 Claims

ABSTRACT OF THE DISCLOSURE

Sulfenamides characterized by the formula

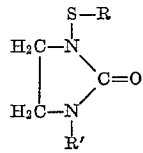

where R is alkyl, aryl, cycloalkyl, and R' is alkylthio, arylthio, cycloalkylthio, or hydrogen, are new compounds which inhibit premature vulcanization of vulcanizable elastomers.

Cross references to related applications

This application is a continuation-in-part of application Ser. No. 579,493 filed Sept. 15, 1966, now abandoned, a continuation-in-part of the application Ser. No. 549,730 filed May 12, 1966, and a continuation-in-part of the application Ser. No. 459,466 filed May 27, 1965, now abandoned.

Background of the invention

The invention relates to new compounds useful as inhibitors of premature vulcanization in rubber.

In the manufacture of vulcanized rubber products, crude rubber is combined with various other ingredients such as fillers, accelerators, and antidegradants to alter and improve processing of the rubber and to improve the properties of the final product. The crude rubber is put through several steps in the plant before it is ready for the final step of vulcanization. Generally the rubber is mixed with carbon black and other ingredients except the vulcanizing agent and accelerator. Then the vulcanizing and accelerating agents are added to this masterbatch in a Banbury mixer or a mill. Scorching, viz, premature vulcanization, can occur at this stage of the processing, during the storage period before vulcanizing, and during the actual vulcanization. After the vulcanizing and accelerating agents are added, the mixture of crude rubber is ready for calendering or extruding and vulcanization. If premature vulcanization occurs during the storage of the crude mixture or during processing prior to vulcanization, the processing operations cannot be carried out because the scorched rubber is rough and lumpy, consequently useless. Premature vulcanization is a major problem in the rubber industry and must be prevented in order to allow the rubber mix to be preformed and shaped before it is cured or vulcanized.

Retarders have long been available to rubber compounders. These include N-nitrosodiphenylamine, salicylic acid, and a terpene-resin acid blend. See Editors of Rubber World, "Compounding Ingredients for Rubber," 91–94 (3rd ed., 1961). Acids as retarders are generally ineffective with thiazolesulfenamide accelerators or adversely affect this vulcanizing process. Nitrosoamines as retarders are only of limited effectiveness with thiazole-sulfenamides derived from primary amines. Certain sulfenamides which are not accelerators per se have been shown to retard mercaptobenzothiazole and other scorchy accelerators, but the effect on another sulfenamide incorporated as the primary accelerator has been marginal. Similarly, mixtures of accelerating sulfenamides have been proposed as a means of improving processing safety, but neither of these innovations has significantly improved a good delayed-action accelerator.

Summary of the invention

We have discovered a class of sulfenamides which are extremely valuable inhibitors of premature vulcanization. These sulfenamides are characterized by the presence of a carbonyl group adjacent to the sulfenamide nitrogen. The characteristic nucleus is

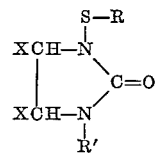

where R is alkyl, aryl, cycloalkyl, and R' is alkylthio, arylthio, cycloalkylthio, or hydrogen. Aryl is used in the usual generic sense to mean any univalent organic radical where free valence belongs to an aromatic carbocyclic nucleus and not to a side chain. The term includes radicals substituted in the carbocyclic nucleus, for example, by alkyl, alkoxy, nitro, chloro, bromo, fluoro, iodo, and hydroxy. It is preferred that the carbocyclic nucleus contains not more than one electronegative substituent. Alkyl is used in the usual generic sense to mean univalent aliphatic radicals of the series $C_nH_{2n+1}$ and includes radicals substituted in the carbon chain, as for example, aryl, alkoxy, nitro, chloro, bromo, fluoro, iodo and hydroxy. Primary, secondary, and tertiary alkyls are included, for example, straight or branched chains. However, primary and secondary alkyl hydrocarbons of 1 to 18 carbon atoms are the preferred alkyl compounds of this invention. The term cycloalkyl includes cycloalkyl radicals of 5 to 12 carbon atoms in the ring. X can be hydrogen, alkyl, halogen, nitro, alkoxy, or hydroxy. A combination of an accelerator and an inhibitor of this invention is an improved rubber additive which allows longer and safer processing time for rubber.

An object of this invention is to promote the progress of science and useful arts. An object of this invention is to provide a method to effectively prevent the premature vulcanization of rubber. A further object of this invention is to provide new chemical compounds useful as premature vulcanization inhibitors especially with delayed-action thiazolesulfenamides. A further object of this invention is to provide a method for a faster rate of cure for vulcanizable rubber without premature vulcanization. A further object of this invention is to provide a method to increase the available processing time prior to the actual vulcanization of rubber. A further object of this invention is to provide a method to prevent the premature vulcanization of crude rubber in storage containing a vulcanizing and accelerating agent. A further object of this invention is to provide a method to prevent the premature vulcanization of rubber during the actual vulcanization step. A further object of this invention is to prevent the premature vulcanization of rubber at any time. A further object of this invention is to provide a safer method for processing and vulcanizing rubber. A further object of this invention is to provide a stabilizer for rubber. A further object of this invention is to provide new and improved vulcanized rubber products. A further object of this invention is to provide a vulcanized rubber stock in which the rate of reversion is reduced. Other objects of the invention will become apparent as the description of our invention proceeds.

These objects are accomplished by using a sulfenamide derived from an amide or imide in the processing of rubber.

Preferred embodiments

Our invention is that compounds having the formula

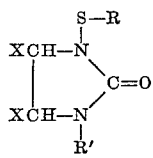

are excellent premature vulcanization inhibitors for a vulcanizable diene rubber where R is alkyl, aryl, or cycloalkyl, and R' is alkylthio, arylthio, cycloalkylthio, or hydrogen. X can be hydrogen, alkyl, halogen, nitro, alkoxy, or hydroxy. More specific examples of R are $CCl_3$, methyl, ethyl, propyl, isopropyl, butyl, amyl, t-butyl, phenyl, benzyl, chlorophenyl, nitrophenyl, tolyl, naphthyl, cyclooctyl, cyclohexyl, cyclopentyl, and cyclododecyl.

Examples of the new compounds of the invention are 1,3 - bis(cyclohexylthio) - 2 - imidazolidinone, 1-cyclohexylthio - 2 - imidazolidinone, 1,3-bis(cyclooctylthio)-2-imidazolidinone, 1 - cyclooctylthio - 2 - imidazolidinone, 1,3 - bis(cyclopentylthio) - 2 - imidazolidinone, 1, - cyclopentylthio - 2 - imidazolidinone, 1,3 - bis(phenylthio)-2-imidazolidinone, 1 - phenylthio - 2 - imidazolidinone, 1,3-bis(chlorophenylthio) - 2 - imidazolidinone, 1,3 - bis(benzylthio) - 2 - imidazolidinone, 1,3 - bis(tolylthio) - 2 - imidazolidinone, 1,3 - bis(nitrophenylthio) - 2 - imidazolidinone, 1,3 - bis(t-butylthio) - 2 - imidazolidinone, 1,3 - bis(methylthio) - 2 - imidazolidinone, 1,3 - bis(ethylthio) - 2 - imidazolidinone, 1,3 - bis(propylthio) - 2 - imidazolidinone, 1,3 - bis(isopropylthio) - 2 - imidazolidinone, 1,3 - bis(n-dodecylthio) - 2 - imidazolidinone, 1- (n-dodecylthio) - 2 - imidazolidinone, 1,3-bis(cyclododecylthio) - 2 - imidazolidinone, and 1,3 - bis(p-chlorophenylthio)-2-imidazolidinone.

Rubber stocks containing delayed-action accelerators can be used in the process of this invention. Cheaper, more scorchy accelerators can also be used with an excellent degree of improvement. The improved vulcanizing process of this invention can be used advantageously to process stocks containing furnace blacks as well as stocks containing other types of blacks and fillers used in rubber compounding. The invention is also applicable to gum stocks.

Our invention is applicable to rubber mixes containing sulfur-vulcanizing agents, peroxide-vulcanizing agents, organic accelerators for vulcanization, and antidegradants, neither being the inhibitor used. For the purposes of this invention, sulfur-vulcanizing agent means elemental sulfur or sulfur containing vulcanizing agent, for example, an amine disulfide or a polymeric polysulfide. The invention is applicable to vulcanization accelerators of various classes. For example, rubber mixes containing the aromatic thiazole accelerators which include benzothiazyl-2-monocyclohexyl sulfenamide, 2-mercaptobenzothiazole, N-tert-butyl-2-benzothiazole sulfenamide, 2-benzothiazolyl diethyldithiocarbamate, and 2-(morpholinothio)benzothiazole can be used. Amine salts of mercaptobenzothiazole accelerators, for example, the t-butyl amine salt of mercaptobenzothiazole, like salts of morpholine, and 2,6-dimethyl morpholine, can be used in the invention. Thiazole accelerators other than aromatic can be used. Stocks containing accelerators, for example, the tetramethylthiuram disulfide, tetramethylthiuram monosulfide, aldehyde amine condensation products, thiocarbamylsulfenamides, thioureas, xanthates, and guanidine derivatives, are substantially improved using the process of our invention. Examples of thiocarbamylsulfenamide accelerators are shown in U.S. Patents 2,381,393, Smith, assigned to Firestone; 2,388,236, Cooper, assigned to Monsanto; 2,424,921, Smith, assigned to Firestone; and British Patent 880,912, Dodson, assigned to Imperial Chemical Industries Limited.

The invention is applicable to accelerator mixtures. The invention is applicable to stocks containing amine antidegradants. Rubber mixes containing antidegradants, for example N-1,3-dimethylbutyl-N'-phenyl-p-phenylenediamine, N,N' - bis(1,4 - dimethylphentyl) - 2 - phenylenediamine, and other phenylenediamines, ketone, ether, and hydroxy antidegradants and mixtures thereof, are substantially improved using the process of our invention. Mixtures of antidegradants, for example, a mixture of N-1,3-dimethylbutyl-N' - phenyl - p - phenylenediamine and N,N' - bis(1,4-dimethylpentyl) - p - phenylenediamine, furnish a much improved final product when used with the inhibitors of this invention.

The inhibitors of our invention can be used in natural and synthetic rubbers and mixtures thereof. Synthetic rubbers that can be improved by the process of this invention include cis-4-polybutadiene, butyl rubber, ethylene-propylene terpolymers, polymers of 1,3-butadiene, for example, 1,3-butadiene itself and of isoprene, copolymers of 1,3-butadiene with other monomers, for example, styrene, acrylonitrile, isobutylene, and methyl methacrylate. The invention relates to diene rubbers, and the terms rubber and diene rubber are synonymous for the purpose of this invention.

The new compounds of this invention are prepared as follows:

To prepare 1,3-bis(phenylthio)-2-imidazolidinone, a solution of 8.6 grams (0.1 mole) of 2-imidazolidinone, 25.0 grams (0.25 mole) of triethylamine and 200 ml. of dimethylforamide (DMF) is cooled to 0° C. in a 500 ml. three-necked reaction flask equipped with a mechanical stirrer and thermometer. To this solution there is added 28.8 grams (0.2 mole) of benzene sulfenyl chloride dissolved in 77 ml. of $CCl_4$ dropwise, controlling the temperature with external cooling during the addition. The triethylamine salt precipitates from solution. The reaction slurry is transferred to a 4.0 liter beaker, and with vigorous stirring there is added 3.0 liters of ice water to precipitate an oil. The oily product is dissolved in ether and separated from the water phase. The ether layer is washed two times with 300 ml. of water. After separation, anhydrous sodium sulfate is added to the ether layer to dry residual water from the product. The solution is filtered to remove the sodium sulfate and the ether is allowed to evaporate to give a dark brown solid. This material is recrystallized from alcohol to yield a white solid which melts at 77°–78° C. Analysis of the product shows 8.96% nitrogen and 21.14% sulfur. Calculated percentages for $C_{15}H_{14}N_2OS_2$ are 9.30% nitrogen and 21.20% sulfur. The infrared spectrum is consistent with the proposed structure. The new structure. The new imidazolidinones listed, supra, are prepared in a similar manner with comparable results. The monosubstituted compounds of this invention such as 1-cyclohexylthio-2-imidazolidinone are also prepared in a similar manner except less sulfenyl chloride or an excess of 2-imidazolidinone is used.

The following tables illustrate the invention in greater detail and the best mode for carrying it out but are not to be construed as to narrow the scope of our invention. For all the rubber stocks tested and described, infra, as illustrative of the invention, Mooney scorch times at 121° C. and 135° C. are determined by means of a Mooney plastometer. The time in minutes ($t_5$) required for the Mooney reading to rise five points above the minimum viscosity is recorded. Longer times are indicative of the activity of the inhibitor. Longer times on the Mooney Scorch Test are desirable because this indicates greater processing safety. Percentage increases in scorch delay are calculated by dividing the Mooney scorch time of the stock containing the premature vulcanization inhibitor by the Mooney scorch time of the control stock, multiplying by 100, and subtracting 100. These increases show the percentage improvement in scorch delay over the control stock which contains no inhibitor. Additionally, cure ratings are calculated from the time required to cure the stocks at 144° C., and in some cases 153° C. Curing characteristics are determined by means of the Monsanto Oscillating Disc Rheometer described by Decker, Wise, and Guerry in Rubber World, December 1962, page 68. From the Rheometer data, R.M.T. is the maximum torque in Rheometer units, $t_3$ or $t_2$ is the time in minutes for a rise of three or two Rheometer units, respectively, above the minimum reading and $t_{90}$ is the time required to obtain a torque 90% of the maximum.

The trademarks of some compounds used in the practice of this invention are Santocure MOR, Santoflex 77, and Santocure NS. Santocure MOR is the accelerator 2-(morpholinothio)benzothiazole. Santoflex 77 is the antidegradant N,N'-bis(1,4-dimethylpentyl)-p-phenylenediamine. Santocure NS is the accelerator N-tert-butyl-2-benzothiazolesulfenamide.

Table I shows the results of tests on N-(phenylthio)-succinimide, N-(t-butylthio)phthalimide, N,N'-di(phenylthio)urea, 1,3-bis(phenylthio)-2-imidazolidinone, and N-(phenylthio)maleimide as premature vulcanization inhibitors in rubber. 1,3-bis(phenylthio)-2-imidazolidinone gives a 124% increase in scorch delay over the control. The rubber mixture of the test is an A-6 masterbatch. An A-6 masterbatch is composed of the following:

| | Parts |
|---|---|
| Smoked sheets | 100 |
| High abrasion furnace black | 50 |
| Zinc oxide | 5 |
| Stearic acid | 3 |
| Hydrocarbon softener | 10 |
| Total parts | 168 |

All stocks contain three parts Santoflex 77, 0.5 part Santocure MOR, and 2.5 parts sulfur.

TABLE I

| | | | | | | |
|---|---|---|---|---|---|---|
| A-6 masterbatch | 168 | 168 | 168 | 168 | 168 | 168 |
| N-(phenylthio)succinimide | | 1.0 | | | | |
| N-(t-butylthio)phthalimide | | | 1.0 | | | |
| N,N'-di(phenylthio)urea | | | | 1.0 | | |
| 1,3-bis(phenylthio)-2-imidazolidinone | | | | | 1.0 | |
| N-(phenylthio)maleimide | | | | | | 1.0 |
| Mooney scorch at 121° C.: | | | | | | |
| $t_5$ | 24.5 | 47.7 | 28.1 | 52.0 | 55.0 | 67.2 |
| Percent increase in scorch delay | | 98.0 | 17.0 | 112.0 | 124.0 | 174.0 |
| Rheometer at 144° C.: | | | | | | |
| R.M.T | 67.3 | 66.0 | 56.7 | 68.0 | 66.7 | 59.8 |
| $t_3$ | 9.0 | 14.5 | 10.8 | 16.5 | 16.5 | 19.0 |
| $t_{90}$ | 21.5 | 27.4 | 34.2 | 29.2 | 29.2 | 33.0 |

Comparable results are obtained when the accelerator Santocure NS and the antidegradant N-1,3-dimethylbutyl-N'-phenyl-p-phenylenediamine or a mixture of this antidegradant and Santoflex 77 are used.

Table II illustrates the use of 1,3-bis(cyclohexylthio)-2-imidazolidinone and 1-cyclohexylthio-2-imidazolidinone in a natural rubber masterbatch composed of the following:

| | Parts |
|---|---|
| Natural rubber | 100 |
| Intermediate super abrasion furnace black | 45 |
| Stearic acid | 2.0 |
| Hydrocarbon softener | 5.0 |
| Sulfur | 2.5 |
| Santocure MOR | 0.5 |
| Antidegradant | 2.0 |
| Zinc oxide | 3.0 |

TABLE II

| | | | |
|---|---|---|---|
| Control | | | |
| 1,3-bis(cyclohexylthio)-2-imidazolidinone | | 1.0 | |
| 1-cyclohexylthio-2-imidazolidinone | | | 1.0 |
| Mooney scorch at 121° C.: | | | |
| $t_5$ | 23.5 | 66.3 | 58.5 |
| Percent increase in scorch delay | | 182.0 | 149.0 |
| Rheometer at 144° C.: | | | |
| R.M.T | 56.5 | 58.8 | 61.5 |
| $t_2$ | 7.0 | 15.0 | 15.0 |
| $t_{90}$ | 18.7 | 35.2 | 31.8 |

Table III illustrates the use of 1,3-bis(p-chlorophenylthio)imidazolidinone in a natural rubber masterbatch containing the same ingredients as the masterbatch of Table II.

TABLE III

| | | |
|---|---|---|
| Control | | |
| 1,3-bis(p-chlorophenylthio)imidazolidinone | | 1.0 |
| Mooney scorch at 121° C.: | | |
| $t_5$ | 43.3 | 96.9 |
| Percent increase in scorch delay | | 114.0 |
| Rheometer at 144° C.: | | |
| R.M.T | 54.2 | 52.3 |
| $t_2$ | 9.6 | 20.0 |
| $t_{90}$ | 21.0 | 31.3 |

Table IV illustrates the use of 1-(n-dodecylthio)-2-imidazolidinone in an A-6 masterbatch containing 2 parts N - 1,3-dimethylbutyl-N'-phenyl-p-phenylenediamine, 0.5 part Santocure MOR, and 2.5 parts sulfur.

TABLE IV

| | | |
|---|---|---|
| Control | | |
| 1-(n-dodecylthio)-2-imidazolidinone | | 1.0 |
| Mooney scorch at 121° C.: | | |
| $t_5$ | 46.0 | 99.1 |
| Percent increase in scorch delay | | 116 |
| Rheometer at 144° C.: | | |
| R.M.T | 53.3 | 58.1 |
| $t_2$ | 11.5 | 26.0 |
| $t_{90}$ | 29.7 | 45.1 |

Comparable results to those in the tables, supra, illustrating utility are obtaining with the inhibitors of this invention which are not illustrated. Results comparable to the rubber preparations of the tables, supra, are obtained using cis-4-polybutadiene, butyl rubber, oil-extended styrene-butadiene rubber, ethylene-propylene terpolymers, polymers of 1,3-butadiene, for example, 1,3-butadiene itself and of isoprene, and copolymers of 1,3-butadiene with other monomers, for example, styrene acrylonitrile, isobutylene, and methyl methacrylate.

Concentration studies show the inhibitors of this invention are effective in rubber at concentrations of 0.05 to 5.0 parts per hundred. Concentrations from 0.25 to 3.0 parts per hundred are preferred.

It is intended to cover all changes and modifications of the examples of the invention herein chosen for purposes of disclosure which do not constitute departures from the spirit and scope of the invention.

We claim:
1. A compound of the formula

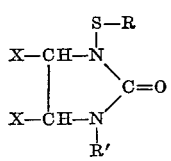

wherein R is unsubstituted alkyl of 1 to 18 carbon atoms, benzyl, cycloalkyl of 5 to 12 carbon atoms, naphthyl, phenyl and substituted phenyl of 6 to 24 carbon atoms wherein the substituents are selected from a group consisting of alkyl, alkoxy, nitro, chloro, bromo, iodo, fluoro, and hydroxy, R' is hydrogen or R—S where R has the same meaning as before and X is hydrogen, alkyl of 1 to 18 carbon atoms, alkoxy of 1 to 18 carbon atoms, nitro, chloro, bromo, fluoro, iodo, or hydroxy.

2. A compound according to claim 1 wherein R is cyclohexyl, R' is hydrogen, and X is hydrogen.

3. A compound according to claim 1 wherein R is cycloalkyl of 5 to 8 carbon atoms, R' is cycloalkylthio of 5 to 8 carbon atoms, and X is hydrogen.

4. A compound according to claim 3 wherein R is cyclohexyl, R' is cyclohexylthio, and X is hydrogen.

5. A compound according to claim 3 wherein R is cyclooctyl, R' is cyclooctylthio, and X is hydrogen.

6. A compound according to claim 3 wherein R is cyclopentyl, R' is cyclopentylthio, and X is hydrogen.

7. A compound according to claim 1 wherein R is unsubstituted alkyl of 1 to 12 carbon atoms,, R' is R—S where R has the same means as before, and X is hydrogen.

8. A compound according to claim 7 wherein R is isopropyl, R' is isopropylthio, and X is hydrogen.

9. A compound according to claim 1 wherein R is benzyl, R' is benzylthio, and X is hydrogen.

10. A compound according to claim 1 wherein R is naphthyl or phenyl, R' is R—S where R has the same meaning as before, and X is hydrogen.

11. A compound according to claim 10 wherein R is phenyl, R' is phenylthio, and X is hydrogen.

12. A compound according to claim 10 wherein R is tolyl, R' is tolylthio, and X is hydrogen.

13. A compound according to claim 1 wherein R is cyclododecyl, R' is cyclododecylthio, and X is hydrogen.

14. A compound according to claim 1 wherein R is phenyl, R' is hydrogen, and X is hydrogen.

References Cited

Klauke et al., Chem. Abst., vol. 59, columns 11510 (1963).

JOHN D. RANDOLPH, Primary Examiner

NATALIE TROUSOF, Assistant Examiner

U.S. Cl. X.R.

260—41, 45.8, 79.5, 326, 326.5, 553, 780, 784, 785, 874